United States Patent [19]
Wolcott et al.

[11] Patent Number: 4,712,579
[45] Date of Patent: Dec. 15, 1987

[54] WELL FLOW LINE CHOKE

[75] Inventors: Herbert A. Wolcott; James H. McHaney, both of Plano, Tex.

[73] Assignee: Atlantic Richfield Company, Los Angeles, Calif.

[21] Appl. No.: 516,067

[22] Filed: Jul. 22, 1983

[51] Int. Cl.[4] .......................................... F16K 25/04
[52] U.S. Cl. .................................. 137/375; 251/362; 251/903
[58] Field of Search ............... 137/375; 251/DIG 4, 251/361, 362

[56] References Cited
U.S. PATENT DOCUMENTS

| | | | |
|---|---|---|---|
| 1,802,766 | 4/1931 | Kerr | 138/44 |
| 2,091,874 | 8/1937 | Neuhaus | 251/DIG. 4 |
| 3,894,562 | 7/1975 | Moseley, Jr. et al. | 138/44 |
| 4,413,646 | 11/1983 | Platt et al. | 137/375 |

*Primary Examiner*—Martin P. Schwadron
*Attorney, Agent, or Firm*—Roderick W. MacDonald

[57] ABSTRACT

In a fluid flow line from a well in the earth, a choke means is employed to restrict the flow of fluids through that line. The choke has a body with apertures therein for passing fluid therethrough and an insert means in one of the apertures of the body which mates with a movable means for creating the choking restriction. The insert means extends to the fluid outlet end of the body of the choke and for a finite distance beyond and outside the body of the choke so that any blast effect that may occur due to pressure change inside the insert means is transferred by the insert means outside of the body of the choke before being released. A preferentially consumable blast receiving means is removably carried by the body of the choke at the fluid outlet end thereof and around the portion of the insert means that extends outside the body of the choke to thereby receive any such blast effect and be preferentially sacrificed to save and increase the operating life of the choke itself and any piping and valve means that may be employed downstream of the outlet end of the choke.

1 Claim, 5 Drawing Figures

WELL FLOW LINE CHOKE

BACKGROUND OF THE INVENTION

Heretofore, variable chokes, i.e., fluid flow regulating means, have been employed in flow lines leading from wells such as oil and/or gas wells in the earth. These well flow line chokes have a movable means therein for varying the amount of restriction to be imposed by the choke on the well fluids flowing therethrough. Normally, the movable means in the choke body is designed to mate with an insert which is fixed in the body of the choke to thereby cause the choking (restricting) effect on the fluids passing therethrough. As will be shown in greater detail hereinafter, the insert means used in the prior art devices was disposed wholly within the body of the choke and either a section of pipe and valve means or the valve means itself was employed immediately downstream the fluid outlet end of the choke. For sake of simplicity only, this invention will be described hereinafter with the valve means being disposed immediately downstream of the choke. It should be understood that this will not always be the practice in the field. However, the benefits of this invention are realized whether a valve or a pipe section immediately follows the choke.

It has been discovered that, because of the pressure changes caused by the choking action, a blast effect is sometimes created which causes a highly turbulent atmosphere that can lead to substantial erosion of the internal surfaces of the body of the choke and the downstream pipe or valve means which, if left unchanged for a substantial period of time, can severely weaken the containing walls of the choke, downstream pipe, and/or downstream valve means.

Because of the construction of the choke and the mounting of the valve means closely to or directly to the choke, inspection for internal corrosion or erosion can be quite difficult and replacement of one or both of these parts of the flow line assembly quite expensive.

BRIEF SUMMARY OF THE INVENTION

In accordance with this invention, the insert means of the choke is modified so as to contain any blast effect generated interiorly thereof and to conduct the blast effect outside of the body of the choke before the insert means releases that blast effect to impinge upon the containing walls of any piping and/or whatever apparatus is located downstream of the choke. In a preferred embodiment of this invention, the insert means is constructed so as to extend continuously to the fluid outlet end of the choke and then for a finite distance beyond that fluid outlet end and outside the body of the choke itself so that any blast effect that may occur due to a pressure change inside the insert means is transferred outside the body of the choke before being released by the insert means.

Further, in accordance with this invention, a valve means is never fixed immediately to the fluid outlet end of the choke, but rather, a preferentially consumable blast receiving means is carried by the body of the choke adjacent its fluid outlet end and surrounding the portion of the insert means which extends outside the body of the choke. In this way, when the elongated insert means of this invention releases the blast effect outside the body of the choke, that blast effect is received by the sacrificial blast receiving means. The blast receiving means is designed so as to be easily inspected for erosion and/or corrosion effects due to the blast effect or other mechanisms, and is easily and economically replaced. This substantially extends the life of the choke itself and any downstream piping, valving, and other equipment with a consequent savings of money and time. Other obvious advantages are obtained by keeping a well producing for a longer time without interruption, and in a safe, reliable environment during the longer period of operation.

Accordingly, it is an object of this invention to provide new and improved apparatus for choking or otherwise restricting the flow of fluid through a flow line from a well.

Other aspects, objects and advantages of this invention will be apparent to those skilled in the art from this disclosure and the appended claims.

DETAILED DESCRIPTION OF THE INVENTION

Figure 1:
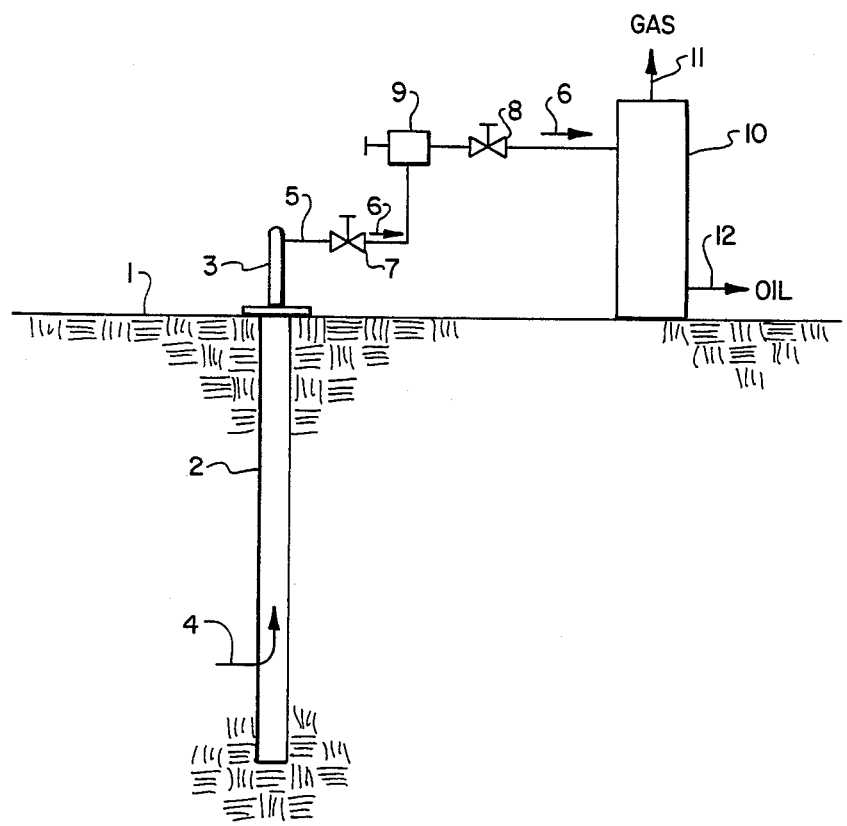
FIG. 1 shows a drawing of a well and a conventional separating system which employs a choke and valve means relating to this invention.
Figure 2:
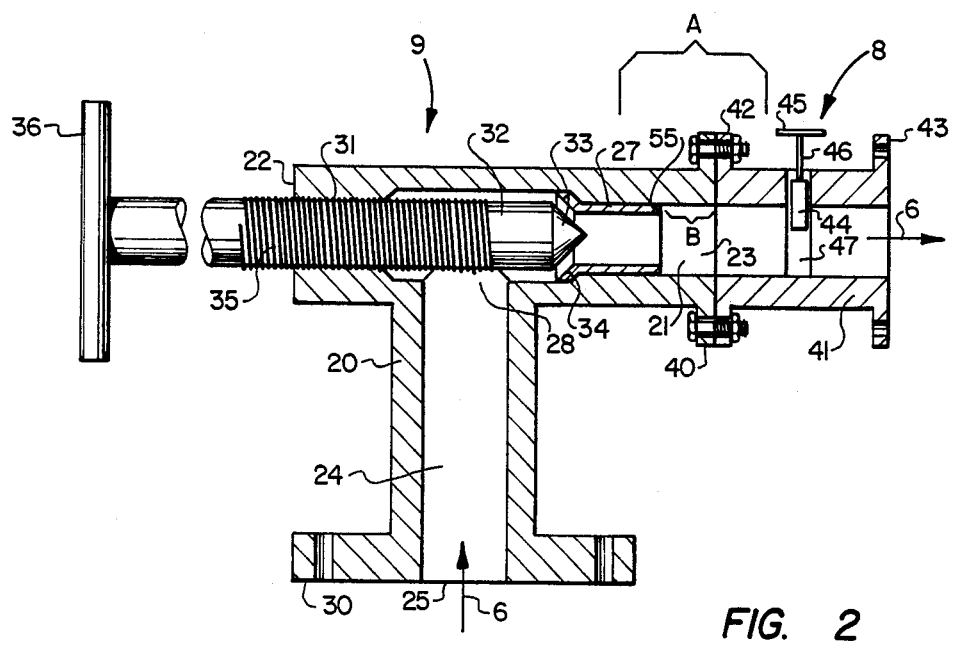
FIG. 2 shows a cross section of a choke and valve means as employed in the prior art.

FIG. 1 shows the surface of the earth 1 having a well 2 drilled thereinto. Well 2 is capped with a conventional wellhead 3 well known in the art, which receives fluids such as oil and/or gas produced from the earth into a wellbore 2 as shown by arrow 4 and passes those produced fluids into flow line 5 as shown by arrow 6. Flow line 5 carries conventional cut-off valves 7 and 8 and choke means 9 so that the flow of fluid between wellhead 3 and separator device 10 can be shut off completely by valve 7 and/or 8 or regulated to any desired extent by adjustment of choke 9. The produced fluids that flow into separator 10 are segregated into desirable components such as a natural gas component and a separate liquid oil component which are individually recovered from separator 10 as shown by arrows 11 and 12. An enlarged cross section of one prior art choke 9 and valve 8 arrangement is shown in FIG. 2. More specifically, FIG. 2 shows choke 9 to be composed of a body 20 which has a first aperture 21 extending longitudinally through said body from a first end 22 of said body to a second, fluid outlet, end 23 of body 20. Body 20 also has a second aperture 24 which has a fluid inlet 25 on one side of body 20 and which second aperture 24 extends through body 20 until it intersects with first aperture 21 to thereby establish fluid communication between said first and second apertures at a point intermediate first and second ends 22 and 23 of first aperture 21. A hollow insert means 27 is carried internally and concentrically within first aperture 21 between the point 28 where first aperture 21 and second aperture 24 intersect one another and fluid outlet end 23. Body 20 of choke 9 is fixed to flow line 5 in a conventional manner by way of flange 30 and conventional bolt means.

First end 22 of aperture 21 carries in a rotatable and movable manner by way of thread means 31, an elongate member 32 which extends interiorally of aperture 21 past intersection point 28 to mate at its furthest internal end point 33 with the sloping surface 34 of insert 27. Member 32 carries thread means 35 thereon for mating with thread means 31 on body 20 so that end 33 can be moved toward or away from insert seat face 34 by simply rotating handle means 36 in a conventional manner. Seal means (not shown) are employed in the annulus between body 20 and member 32 in a conventional manner to prevent leaking of fluids from aperture 21 out through aperture end 22.

Bolted in a conventional manner to flange means 40 of body 20 adjacent fluid outlet end 21, is a conventional gate valve 8 which is composed of a valve body 41 carrying flange means 42 and 43 at opposite ends thereof so that valve 8 can be fixed to choke 9 at flange 42 and to flow line 5 at flange 43. Valve 8 has a conventional gate means 44 which, by rotation of handle 45 and stem 46, can be lowered down into opening 47 in the interior of body 41 thereby shutting off the flow of fluid through the system, if desired.

Figure 3:
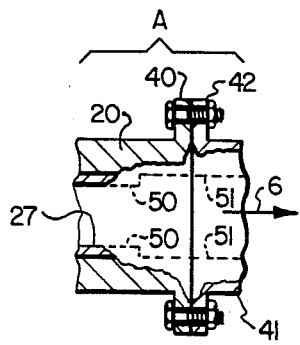
FIG. 3 shows a cross section of a portion of the choke and valve means of FIG. 2 with the consequent erosion of portions thereof as heretofore experienced.

FIG. 3 shows a cross section in area A of FIG. 2 after use of the apparatus in FIG. 2 for a substantial time under flow restriction conditions which create sufficient pressure change within insert 27 to cause a sufficiently turbulent effect by the fluids passing therethrough to generate what is termed herein a blast effect. It has been discovered that this blast effect can lead to sufficient erosion and/or corrosion of insert 27, body 20 downstream of insert 27 and even body 41 to an extent that requires remedial attention.

FIG. 3 shows the enlargrd section A of FIG. 2 after actual erosion had been experienced. Dotted line 50 shows the original extent of the downstream end of insert 27 while dotted line 51 shows the original internal surface level of both body 20 of choke 9 and body 41 of valve means 8. It can be seen that a considerable amount of material has been lost, particularly at the interface between flanges 40 and 42. Such a result can require replacement of choke 9 and valve 8 which is not only expensive but also time consuming. Further, because the loss of material occurs downstream of insert 27 and upstream of valve gate 44, it is extremely hard to inspect this area for material loss to determine if there is any material loss at all and if so, whether the loss is of such a magnitude as to make replacement of choke 9 and/or valve 8 desirable. If a section of pipe is originally fixed to flange 40 of choke 9 instead of valve B, the same blast effect problem is encountered with consequent loss of pipe wall material similar to that shown in FIG. 3 for valve body 41.

Figure 4:
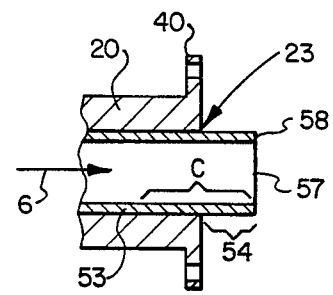
FIG. 4 shows an embodiment of this invention which employs the elongated insert means for containing blast effects within the body of the choke and transferring those blast effects outside the body of the choke before releasing same.

FIG. 4 shows, in accordance with this invention, the replacement of insert 27 of FIGS. 2 and 3 with a new insert 53 which extends all the way to and beyond fluid outlet end 23 so as to extend outside of body 20 a finite distance 54. It can be seen from FIG. 2 that the downstream end 55 of insert 27 stopped a substantial distance B short of fluid outlet end 23 and this allowed the blast effect created in the interior of insert 21 to be transferred to the body 20 of choke 9 and the body 41 of valve 8 thereby resulting in the loss of material shown in FIG. 3. However, by making insert 53 of FIG. 4 extend a distance C which is equal to distance B of FIG. 2 plus extension 54 of FIG. 4, any blast effect created in the interior of insert 53 is contained by that insert and transferred out of body 20 before being released at outlet end 57. This fully protects body 20 from the effects of such a blast. Further, even if some loss of material from downstream end 58 of insert 53 is experienced, for example a loss similar to that shown for insert material 27 in FIG. 3 by way of dotted line 50, the substantial length of extension 54 beyond outlet end 23 can tolerate substantial material loss and still protect body 20.

Figure 5:
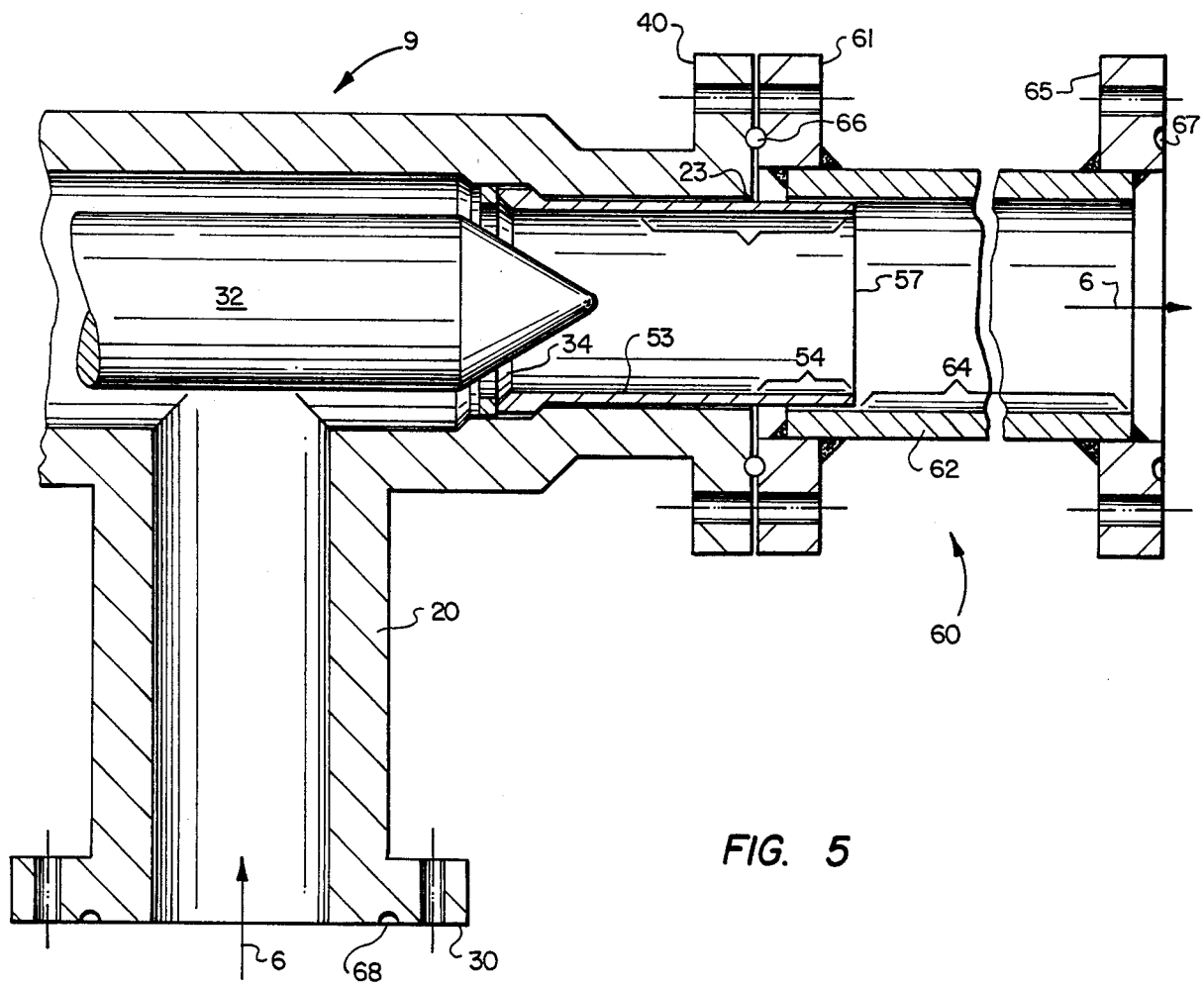
FIG. 5 shows a preferred embodiment of the apparatus of this invention which employs the combination of an elongated insert means and a consumable blast receiving means immediately adjacent the fluid outlet end of the choke.

FIG. 5 shows choke 9 of FIG. 2 modified so as to employ the elongated insert 53 of FIG. 4, and, in addition, to employ immediately downstream of the outlet end 23 of body 20 a blast receiving means 60 which is carried by body 20 using flange 61 that mates with flange 40 of body 20 adjacent fluid outlet end 23. Means 60 surrounds portion 54 of insert means 53 which extends outside body 20, and receives any blast effect that is released by insert means 53 at its outlet end 57. In this embodiment of the invention, blast receiving means 60 comprises, besides flange means 61, a preferentially consumable, hollow, elongate member 62 which fits concentrically about portion 54 of insert 53 and which extends for a finite distance 64 away from end 57 of insert 53 so as to absorb essentially all of the effects of the blast effect after its release from insert 53. Means 60 is not a conventional pipe section in that it can be designed to employ special means, such as a thicker or reinforced member 62, since member 62 will receive essentially all of the blast effect. Distance 64 will vary considerably depending upon the nature of the fluids being transmitted therethrough, the temperature and pressure conditions of those fluids, the pressure change created by the amount of choking caused by the proximity of member 32 to seat 34, and the like. Thus, a specific length, or even range of lengths, for element 64 cannot be given. However, distance 64 should be sufficient so that member 62 absorbs all or essentially all of the impact of the blast effect released by insert 53 at end 57.

Blast receiving means 60 carries at its downstream end flange means 65 for mating with flange means 42 of valve 8 of FIG. 2 or the like. Thus, it can be seen that erosion and/or corrosion of body 20 of choke 9 in FIG. 5 and body 41 of valve 8 of FIG. 2 is essentially eliminated by way of sacrificial member 60 disposed therebetween and its interaction with elongate insert 53 of FIG. 5. Conventional seal means such as O-ring 66 between flanges 40 and 61 of FIG. 5 can be employed as is well known in the art. Similar seal means are employed in depression 67 of flange 65 and depression 68 of flange 30. Such seal means can also be employed between mating flanges in the prior figures hereof but have not been shown for sake of simplicity.

Reasonable variations and modifications are possible within the scope of this disclosure without departing from the spirit and scope of this invention.

We claim:

1. In a well flow line choke having a body with a first aperture which extends longitudinally through said body from a first end of said body to a second fluid outlet end of said body, said body having a second aperture therein which has a fluid inlet at one side of said body and which extends through said body to intersect and communicate with said aperture intermediate the first and second ends of said first aperture, and hollow insert means carried concentrically and interiorally of said first aperture between the point where said first and second apertures intersect and said fluid outlet end of said first aperture, the improvement comprising said insert means extending in a continuous unrestricted manner to said fluid outlet end of said first aperture and a substantial distance beyond said fluid outlet end and outside said body whereby any blast effect that may occur due to a pressure change inside said insert means in said body is transferred without flow restriction outside said body by said insert means before being released by said insert means, and a blast receiving means carried by said body adjacent said fluid outlet end and surrounding the portion of said insert means which extends outside said body whereby any blast effect released by said insert means is received by said blast receiving means, said blast receiving means further comprising a preferentially consumable, hollow, elongated member which is specifically designed to receive and absorb a blast effect and which fits concentrically about the portion of said insert means which extends outside said body, said member extending a finite distance away from the fluid outlet end of said first aperture, said member being removably carried by said body and said flow line for ease of inspection and replacement should excessive wear be experienced by said member due to any blast effect from fluid passing therethrough.

* * * * *